United States Patent
Gasslbauer

(10) Patent No.: US 8,209,844 B2
(45) Date of Patent: Jul. 3, 2012

(54) BRAKE PAD FOR A DISC BRAKE

(75) Inventor: Franz Gasslbauer, Johanniskirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/788,344

(22) Filed: May 27, 2010

(65) Prior Publication Data

US 2010/0229369 A1  Sep. 16, 2010

Related U.S. Application Data

(60) Division of application No. 12/184,028, filed on Jul. 31, 2008, now abandoned, which is a continuation of application No. PCT/EP2007/000615, filed on Jan. 25, 2007.

(30) Foreign Application Priority Data

Feb. 1, 2006 (DE) .......................... 10 2006 004 550

(51) Int. Cl.
*B23P 25/00* (2006.01)
*F16D 69/00* (2006.01)

(52) U.S. Cl. ................................... 29/527.5; 188/250 G

(58) Field of Classification Search ................. 29/527.5; 188/250 R, 250 G, 250 B, 73.1
See application file for complete search history.

(56) References Cited

U.S. PATENT DOCUMENTS

| | | | |
|---|---|---|---|
| 2,879,866 A * | 3/1959 | Newell ............................ | 188/234 |
| 3,693,764 A | 9/1972 | Anders | |
| 4,569,424 A * | 2/1986 | Taylor, Jr. ................. | 188/250 G |
| 4,799,579 A | 1/1989 | Myers et al. | |
| 5,033,590 A | 7/1991 | Kobayashi et al. | |
| 5,129,487 A | 7/1992 | Kobayashi et al. | |
| 5,141,083 A | 8/1992 | Burgoon | |
| 5,285,873 A | 2/1994 | Arbesman | |
| 5,890,566 A | 4/1999 | Yoshida et al. | |
| 6,135,244 A | 10/2000 | LeBris | |
| 6,267,206 B1 | 7/2001 | Grimme et al. | |
| 6,279,222 B1 * | 8/2001 | Bunker et al. ............... | 29/527.5 |
| 6,367,600 B1 * | 4/2002 | Arbesman ................. | 188/250 G |
| 6,623,581 B2 * | 9/2003 | Baumeister ................... | 156/94 |

(Continued)

FOREIGN PATENT DOCUMENTS

AT         277311 B         12/1969

(Continued)

OTHER PUBLICATIONS

International Preliminary Report on Patentability including English translation (Eleven (11) pages).

*Primary Examiner* — David Bryant
*Assistant Examiner* — Jacob Cigna
(74) *Attorney, Agent, or Firm* — Crowell & Moring LLP

(57) ABSTRACT

A brake pad includes a support plate which is embodied as a cast piece as well as a friction lining that is attached therein. The support plate is provided with a planiform base and raised, positively connected parts, which are molded onto the base and are enclosed by the friction lining. At least some of the positively connected parts are surrounded in at least some areas by an adjacent cavity of the base, resulting in an improved connection of the friction lining to the support plate.

12 Claims, 4 Drawing Sheets

U.S. PATENT DOCUMENTS

| | | |
|---|---|---|
| 6,860,368 B2 | 3/2005 | Kulis, Jr. et al. |
| 2007/0170023 A1 | 7/2007 | Yamamoto |

FOREIGN PATENT DOCUMENTS

| | | | |
|---|---|---|---|
| DE | 2242877 A | * | 3/1974 |
| DE | 19507916 A1 | | 9/1996 |
| DE | 19532019 C1 | | 2/1997 |
| DE | 19650026 C2 | | 6/1998 |
| DE | 69602602 T2 | | 12/1999 |
| EP | 0731288 B1 | | 9/1996 |
| EP | 0760436 B1 | | 3/1997 |
| EP | 07640436 B1 | | 3/1997 |
| GB | 1160503 | | 8/1969 |
| GB | 2299382 A | | 10/1996 |
| GB | 2303891 A | | 3/1997 |

* cited by examiner

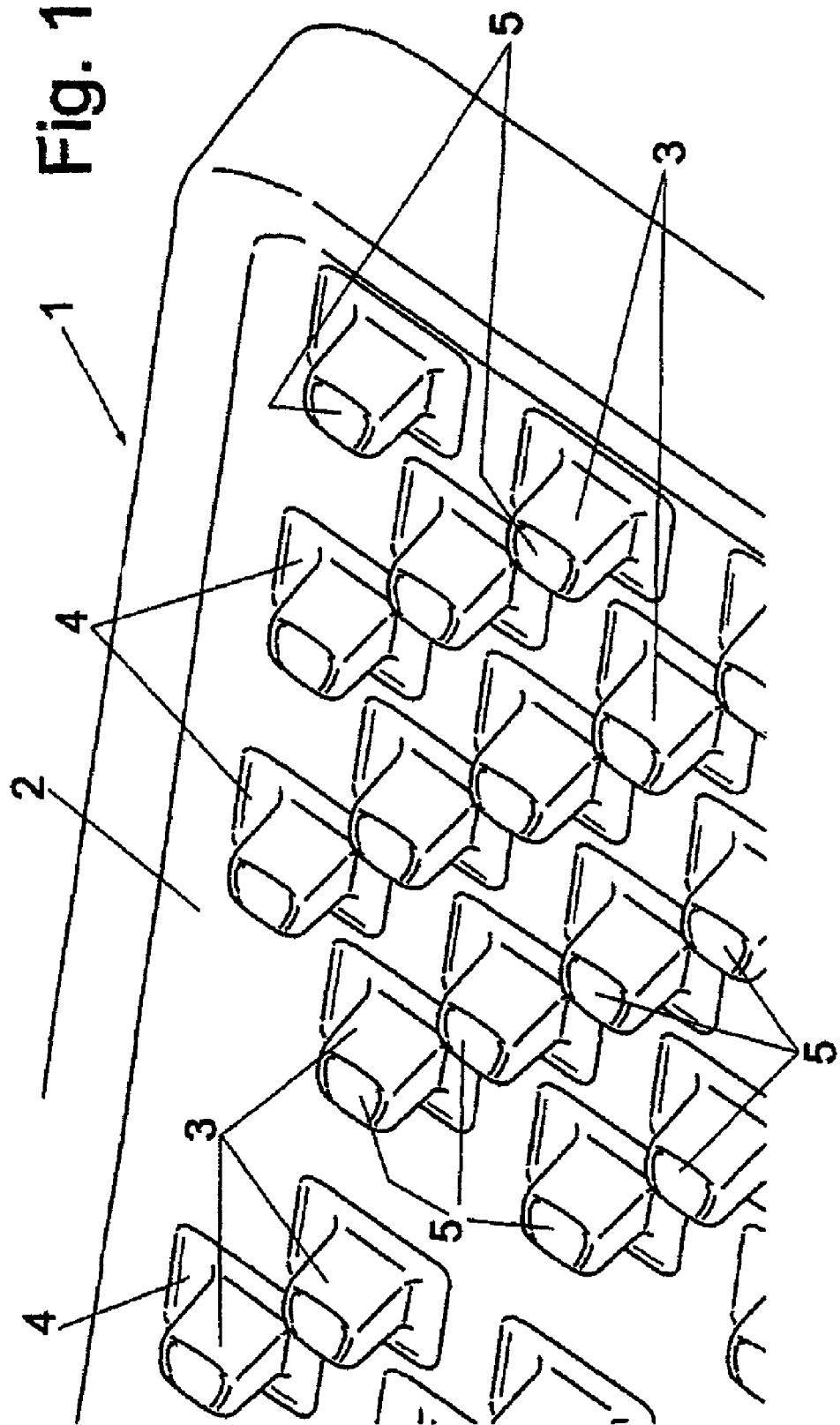

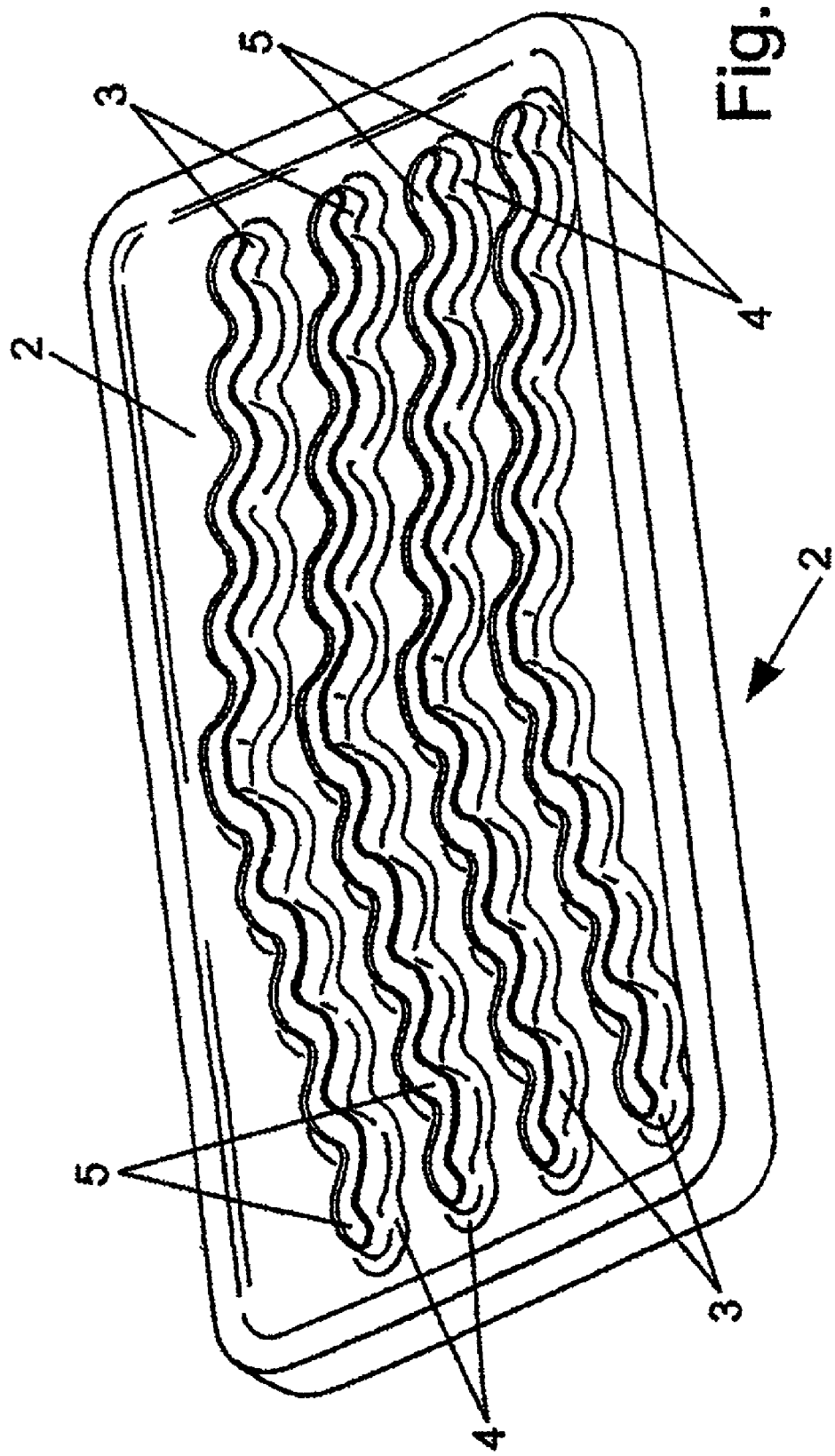

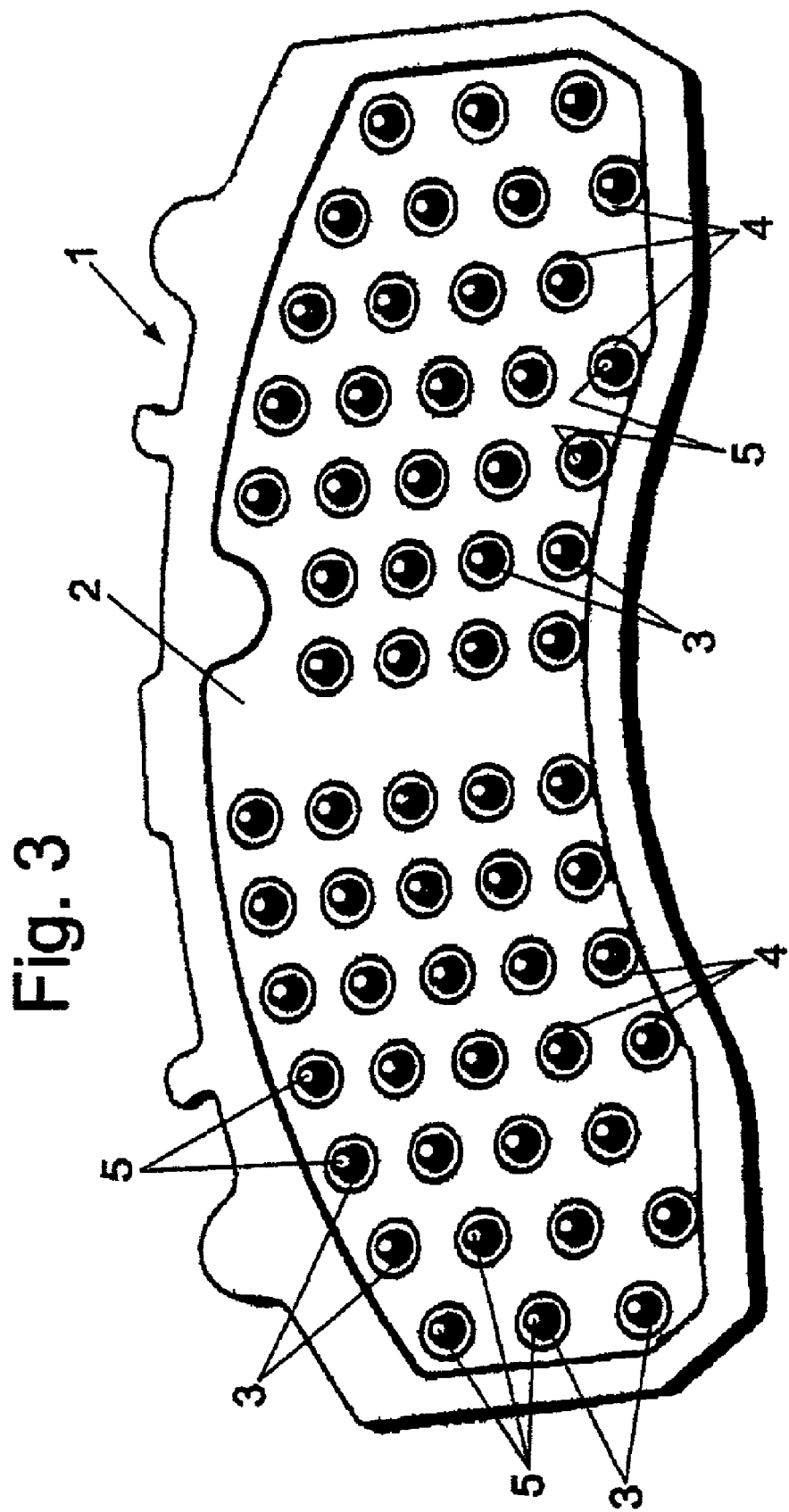

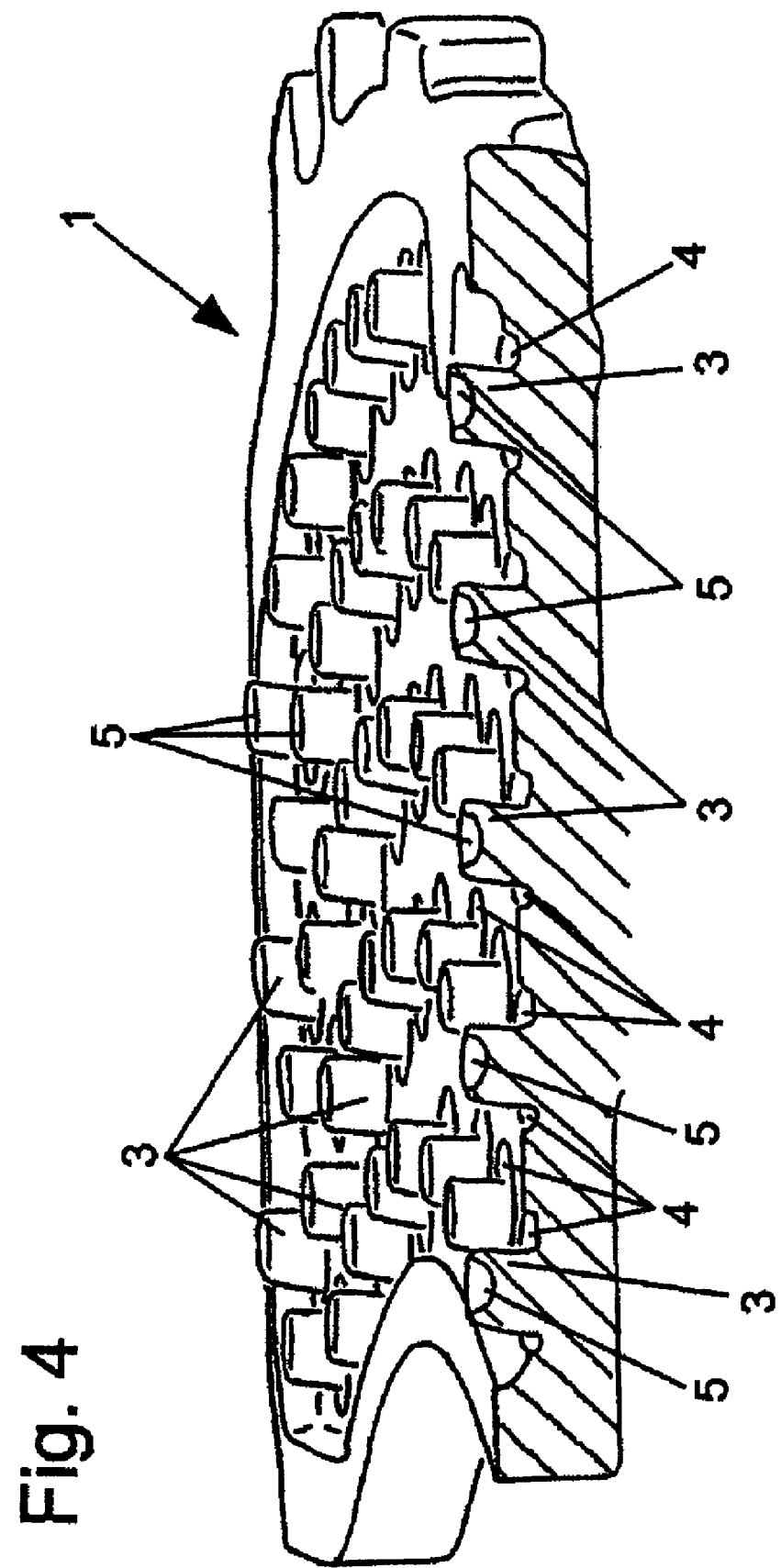

BRAKE PAD FOR A DISC BRAKE

CROSS-REFERENCE TO RELATED APPLICATIONS

This application is a divisional of U.S. patent application Ser. No. 12/184,028, filed Jul. 31, 2008, the entire disclosure of which is expressly incorporated herein by reference and which is a continuation of PCT International Application No. PCT/EP2007/000615, filed Jan. 25, 2007, the entire disclosure of which is expressly incorporated herein by reference and which claims priority under 35 U.S.C. §119 to German Patent Application No. DE 10 2006 004 550.5, filed Feb. 1, 2006, the entire disclosure of which is expressly incorporated herein by reference and the priority of which is claimed.

BACKGROUND AND SUMMARY OF THE INVENTION

The invention relates to a brake pad for a disc brake of a vehicle, in particular a commercial vehicle, having a lining carrier plate which is configured as a cast part and having a friction lining which is fastened in the lining carrier plate.

In addition to a brake disc, disc brakes for vehicles, in particular for commercial vehicles, also include two brake pads, which can be pressed against the friction faces of a brake disc when required, that is to say in the case of a braking operation.

Here, each brake pad includes a lining carrier plate and a friction lining which is fastened thereto and bears frictionally against the associated friction face of the brake disc in the use position.

Special significance is given to the connection of the friction lining to the lining carrier plate, since high loads occur resulting from jolts caused by operation and from frictional heat produced during braking.

In order to produce a correspondingly fixed connection which, in addition to the above-mentioned jolt and thermal loading, can absorb bending and shearing loads that occur, it is known, for example, from DE 195 32 019 C1, to integrally form positive connection mechanisms in the form of round or angular, lug-shaped elevations on a basic body of the lining carrier plate. In order to anchor the friction lining, in particular in order to absorb shearing forces, the positively connected parts are provided with undercuts, which can be produced, however, only in a very complicated process. Here, the friction lining is held positively only on the positively connected parts, with the result that there is the risk that, if the friction lining tears, parts are released from it, which not only limits the functional capability of the disc brake overall to a great extent, but possibly leads to its failure, since the released parts can jam in the brake caliper and impede the displacement movement of the brake pads and/or the brake disc.

Moreover, the production of the known brake pad is very expensive, above all also for the reason that the mold bodies which are used in the mold and include an elastomer for the formation of the positive connection mechanisms of the lining carrier plate are subjected to high wear and, therefore, have to be replaced frequently. Special significance is given to this circumstance precisely because brake pads of this type are used in large quantities.

The invention is therefore based on the object of further developing a brake pad such that it can be produced less expensively while improving its functional reliability.

According to the invention, a brake pad for a disc brake of a vehicle, in particular a commercial vehicle, has a lining carrier plate which is configured as a cast part, and has a friction lining, which is fastened in the lining carrier plate. The lining carrier plate has a flat-shaped basic body and elevated or raised positively connected parts, which are integrally cast thereon and are enclosed by the friction lining. At least one part of the positively connected parts is surrounded, at least in regions, by an adjoining depression of the basic body.

As a result of this structural embodiment of the brake pad, both less expensive production and an improvement in the adhesion of the friction lining material on the basic body are possible.

Since undercuts which are to be introduced in a targeted manner are dispensed with, the lining carrier plate can be cast in a substantially simpler and less expensive manner. This relates to both the casting itself and preparatory work, such as the production of a sand mold and the like, and also to the unproblematic production of the casting mold which is then possible and in which the use of correspondingly elastic mold means can be dispensed with, so that a considerably higher service life of the corresponding model results. Overall, the invention leads to a substantial cost reduction of the brake pad, which cost reduction has a particular significance in view of the series production of such brake pads.

Although the introduction of predefined undercuts is dispensed with, the production-related roughness of the cast surface on its own leads to interlocking of the friction lining with the elevated, positively connected, parts, just as otherwise with the surface of the basic body.

The embedding of the friction lining into the depressions of the basic body which surround at least a part of the positively connected parts at least in regions ensures additional security for holding the friction lining on the lining carrier plate, which depressions make possible improved absorption of shearing forces that occur and additionally guarantee improved securing of friction lining parts if the friction lining is destroyed, for example, by the formation of cracks. That is to say, the friction lining parts continue to adhere to the carrier plate even when the brake is not in engagement, that is to say, is released.

The shape, dimensions and arrangement of the positively connected parts can be of different designs. Here, the configuration of the positively connected parts is substantially dependent on the force absorption which occurs during braking, the temperature which is produced, and the properties of the friction materials used (which can be different as a result of various production processes and compositions).

For instance, the positively connected parts can be integrally molded in the form of round or rectangular pins or pegs, which are arranged offset with respect to one another, in a row or extending obliquely in one or more directions. It is also contemplated to configure the positively connected parts as meandering webs, which are integrally cast such that they extend parallel to one another, for example.

Further advantageous embodiments of the invention are described and claimed herein.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1-3 show, in each case, one exemplary embodiment of a lining carrier plate of a brake pad according to the invention in a perspective view or a plan view; and FIG. 4 shows a section through the lining carrier plate according to FIG. 3 in a perspective view.

DETAILED DESCRIPTION OF THE DRAWINGS

The figures show, in each case, one exemplary embodiment of a lining carrier plate 1, which is a constituent part of a brake pad which, moreover, has a friction lining (not shown) connected fixedly to the lining carrier plate by means of positively connected parts 3.

The positively connected parts 3 of the lining carrier plate 1, which is composed of a cast material, are integrally cast onto a flat-shaped (basically planar) basic body 2 and, in the example shown in FIG. 1, are shaped as pegs which lie next to one another in offset rows and are of square or rectangular configuration in cross section.

According to the invention, the positively connected parts 3 are surrounded, in each case, by an adjacent depression 4 of the basic body 2, into which depression 4 the friction lining material which is to be applied is inserted.

The free end side of the positively connected parts 3, which faces away from the base plate 2, is provided with a recess 5 which, as can be seen very clearly, in particular in FIG. 4, is of a cavity-shaped configuration but can also certainly extend deeper into the positively connected parts.

In the example of FIG. 2, the positively connected parts 3 are configured as webs, which extend in a meandering manner over the planar basic body, and of which a plurality are arranged in parallel and at a spacing from one another. In each case, they are surrounded by a depression 4, while the free end side has a recess 5 here also.

The example which is shown in FIG. 3 is comparable with the exemplary embodiment in FIG. 1, in the former the positively connected means 3 likewise being shaped as pegs or pins but of round cross section and likewise being provided with recesses 5, like the positively connected means 3 which are shown in the other examples.

The depressions 4 surrounding the positively connected parts 3 are configured in this case in the manner of circular rings, as can be seen in FIG. 4.

Just like the depressions 4, the recesses 5 ensure fixed anchoring of the friction lining, in particular also with regard to absorbing the shearing forces that occur.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process of making a brake pad for a disc brake, consisting essentially of:
providing a cast lining carrier plate having a substantially planar basic body, a plurality of elevated positive connection parts integrally cast together with the basic body, and each of said plurality of elevated positive connection parts being associated with a depression in the basic body adjoining said connection parts, each of said depressions being independent of any other of said depressions and extending below a surface face of the basic body in a region immediately adjacent its respective one of said connection parts; and
fastening a friction lining to the lining carrier plate so that the elevated positive connection parts are enclosed by the friction lining.

2. The process according to claim 1, wherein each of the adjoining depressions surrounds, at least in regions, the at least one connection part.

3. The process according to claim 1, wherein at least one of the connection parts is shaped as a peg extending away from the basic body, and wherein each peg has a polygonal or round cross-section.

4. The process according to claim 3, wherein the pegs are arranged in rows offset with respect to one another.

5. The process according to claim 1, wherein a plurality of the positive connection parts are configured as webs arranged spaced from one another.

6. The process according to claim 5, wherein said webs extend in a meandering manner over a surface of the basic body.

7. The process according to claim 5, wherein said webs extend parallel to one another over a surface of the basic body.

8. The process according to claim 1, wherein at least one connection part includes a recess on a free-end side facing away from the basic body, said recess being operatively configured to additionally secure the friction lining.

9. The process according to claim 8, wherein at least one of the connection parts is shaped as a peg extending away from the basic body, and wherein each peg has a polygonal or round cross-section.

10. The process according to claim 8, wherein a depth of the recess corresponds approximately to a height of the connection part.

11. The process according to claim 8, wherein the recess has a cavity-shaped configuration.

12. The process according to claim 11, wherein a depth of the recess corresponds approximately to a height of the connection part.

* * * * *